United States Patent
Simar, Jr. et al.

(10) Patent No.: US 7,039,790 B1
(45) Date of Patent: May 2, 2006

(54) VERY LONG INSTRUCTION WORD MICROPROCESSOR WITH EXECUTION PACKET SPANNING TWO OR MORE FETCH PACKETS WITH PRE-DISPATCH INSTRUCTION SELECTION FROM TWO LATCHES ACCORDING TO INSTRUCTION BIT

(75) Inventors: Laurence R. Simar, Jr., Richmond, TX (US); Richard A. Brown, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 407 days.

(21) Appl. No.: 09/702,320

(22) Filed: Oct. 31, 2000

Related U.S. Application Data

(60) Provisional application No. 60/183,527, filed on Feb. 18, 2000, provisional application No. 60/183,609, filed on Feb. 18, 2000, provisional application No. 60/165,512, filed on Nov. 15, 1999.

(51) Int. Cl.
  *G06F 9/38* (2006.01)
(52) U.S. Cl. ..................... 712/215; 712/206
(58) Field of Classification Search ............ 712/23, 712/24, 205, 215, 204, 214, 206
  See application file for complete search history.

(56) References Cited

U.S. PATENT DOCUMENTS 5,459,844 A   10/1995 Eickemeyer et al.
5,922,065 A *  7/1999 Hull et al. .................. 712/24
6,137,836 A * 10/2000 Haataja ................. 375/240.08
6,237,077 B1*  5/2001 Sharangpani et al. ......... 712/24
6,324,639 B1* 11/2001 Heishi et al. ............... 712/212
6,470,445 B1* 10/2002 Arnold et al. .............. 712/218

FOREIGN PATENT DOCUMENTS

EP      0 667 571 A2    8/1995
EP      0 855 648 A2    7/1998
WO      WO 99/63417    12/1999

OTHER PUBLICATIONS

IBM: Journal of Research and Development—*The IBM RISC System/6000 Processor*, vol. 34, No. 1, pp. 12-21, 37-43; and 85.

* cited by examiner

*Primary Examiner*—Richard L. Ellis
*Assistant Examiner*—David J. Huisman
(74) *Attorney, Agent, or Firm*—Robert D. Marshall, Jr.; W. James Brady, III; Frederick J. Telecky, Jr.

(57) ABSTRACT

A data processing system with a microprocessor. The microprocessor has an instruction execution pipeline including fetch and decode stages and several functional execution units. Fetch packets contain a plurality of instruction words. Execute packets include a plurality of instruction words that can be executed in parallel by two or more execution units. An execution packet can span two or more fetch packets. A predetermined bit in each instruction marks whether the next instruction is executed in parallel with the current instruction. Instructions in an execute packet are dispatched to appropriate functional execution units based on instruction type. Upon a branch into an execute packet instructions at memory addresses before the branch location are not executed in parallel with instructions following the branch location.

2 Claims, 8 Drawing Sheets

FIG. 3

| 31 | 0 | 31 | 0 | 31 | 0 | 31 | 0 | 31 | 0 | 31 | 0 | 31 | 0 | 31 | 0 |
|---|---|---|---|---|---|---|---|---|---|---|---|---|---|---|---|
| | P | | P | | P | | P | | P | | P | | P | | P |

| INSTRUCTION A 000002 | INSTRUCTION B 001002 | INSTRUCTION C 010002 | INSTRUCTION D 011002 | INSTRUCTION E 100002 | INSTRUCTION F 101002 | INSTRUCTION G 110002 | INSTRUCTION H 111002 |

LSBs OF THE BYTE ADDRESS

FIG. 4A

| 31 | 0 | 31 | 0 | 31 | 0 | 31 | 0 | 31 | 0 | 31 | 0 | 31 | 0 | 31 | 0 |
|---|---|---|---|---|---|---|---|---|---|---|---|---|---|---|---|
| | 0 | | 0 | | 0 | | 0 | | 0 | | 0 | | 0 | | 0 |

| INSTRUCTION A | INSTRUCTION B | INSTRUCTION C | INSTRUCTION D | INSTRUCTION E | INSTRUCTION F | INSTRUCTION G | INSTRUCTION H |

FIG. 4B

| 31 | 0 | 31 | 0 | 31 | 0 | 31 | 0 | 31 | 0 | 31 | 0 | 31 | 0 | 31 | 0 |
|---|---|---|---|---|---|---|---|---|---|---|---|---|---|---|---|
| | 1 | | 1 | | 1 | | 1 | | 1 | | 1 | | 1 | | 0 |

| INSTRUCTION A | INSTRUCTION B | INSTRUCTION C | INSTRUCTION D | INSTRUCTION E | INSTRUCTION F | INSTRUCTION G | INSTRUCTION H |

FIG. 4C

| 31 | 0 | 31 | 0 | 31 | 0 | 31 | 0 | 31 | 0 | 31 | 0 | 31 | 0 | 31 | 0 |
|---|---|---|---|---|---|---|---|---|---|---|---|---|---|---|---|
| | 0 | | 1 | | 1 | | 1 | | 1 | | 0 | | 1 | | 0 |

| INSTRUCTION A | INSTRUCTION B | INSTRUCTION C | INSTRUCTION D | INSTRUCTION E | INSTRUCTION F | INSTRUCTION G | INSTRUCTION H |

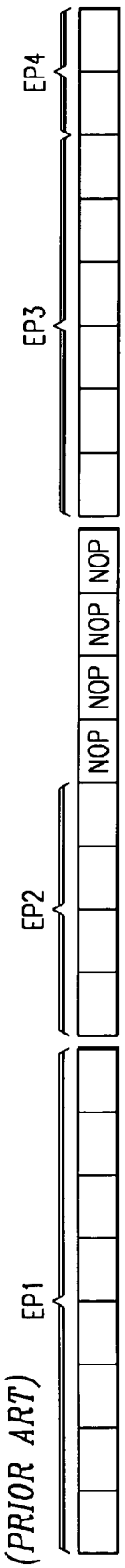
FIG. 5
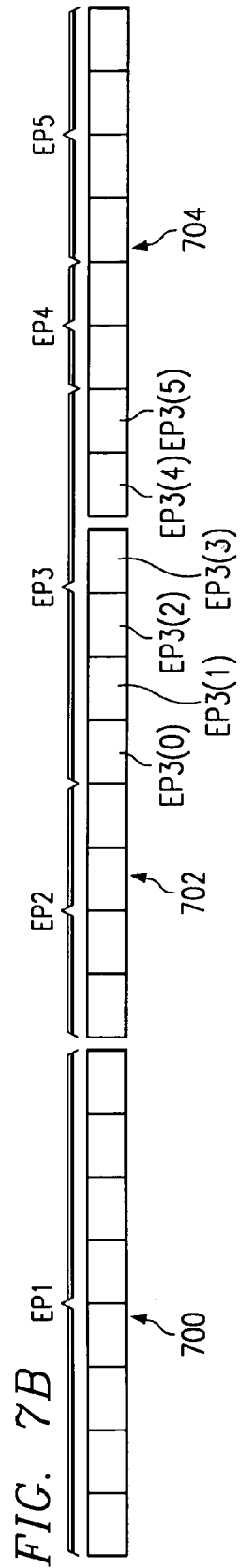
FIG. 7A
(PRIOR ART)
FIG. 7B

VERY LONG INSTRUCTION WORD MICROPROCESSOR WITH EXECUTION PACKET SPANNING TWO OR MORE FETCH PACKETS WITH PRE-DISPATCH INSTRUCTION SELECTION FROM TWO LATCHES ACCORDING TO INSTRUCTION BIT

This application claims priority under 35 USC §119(e)(1) of Provisional Application No. 60/165,512, filed Nov. 15, 1999, of Provisional Application No. 60/183,527, filed Feb. 18, 2000, and of Provisional Application No. 60/183,609, filed Feb. 18, 2000.

NOTICE (C) Copyright 2000 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD OF THE INVENTION

This invention relates to data processing devices, electronic processing and control systems and methods of their manufacture and operation, and particularly relates to memory access schemes of microprocessors optimized for digital signal processing.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Microprocessor designers have increasingly endeavored to exploit parallelism to improve performance. One parallel architecture that has found application in some modern microprocessors utilizes instruction fetch packets and multiple instruction execution packets with multiple functional units, referred to as a Very Long Instruction Word (VLIW) architecture.

Digital systems designed on a single integrated circuit are referred to as an application specific integrated circuit (ASIC). MegaModules are being used in the design of ASICs to create complex digital systems a single chip. (MegaModule is a trademark of Texas Instruments Incorporated.) Types of MegaModules include SRAMs, FIFOs, register files, RAMs, ROMs, universal asynchronous receiver-transmitters (UARTs), programmable logic arrays and other such logic circuits. MegaModules are usually defined as integrated circuit modules of at least 500 gates in complexity and having a complex ASIC macro function. These MegaModules are predesigned and stored in an ASIC design library. The MegaModules can then be selected by a designer and placed within a certain area on a new IC chip.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. However, execution packets in VLIW architectures must be aligned within a single instruction fetch packet.

The increasing demands of technology and the marketplace make desirable even further structural and process improvements in processing devices, application systems, and methods of operation and manufacture.

SUMMARY OF THE INVENTION

An illustrative embodiment of the present invention seeks to provide a microprocessor and a method for accessing memory by a microprocessor that improves digital signal processing performance. Aspects of the invention are specified in the claims.

In an embodiment of the present invention, fetch packets contain a plurality of instruction words. Execution packets include a plurality of instruction words that can be executed in parallel by two or more execution units. An execution packet can span two or more fetch packets.

In an embodiment of the present invention, there are no execute packet boundary restrictions, thereby eliminating a need to pad a fetch packet by adding unneeded NOP instructions.

BRIEF DESCRIPTION OF THE DRAWINGS

Other features and advantages of the present invention will become apparent by reference to the following detailed description when considered in conjunction with the accompanying drawings, in which:

FIG. 3 shows the basic format of a fetch packet of the DSP of FIG. 1;

FIG. 4A depicts a fetch packet of FIG. 3 with fully serial p-bits;

FIG. 4B depicts a fetch packet of FIG. 3 with fully parallel p-bits;

FIG. 4C depicts a fetch packet of FIG. 3 with partially serial p-bits;

FIG. 5 depicts fetch packet n, which contains three execute packets, shown followed by six fetch packets n+1 through n+6, each with one execution packet containing 8 parallel instructions;

FIG. 7A is another illustration of fetch packets and execution packets in the prior art processor of FIG. 6;

FIG. 7B is an illustration of execution packets spanning fetch packets for the processor of FIG. 1;

DETAILED DESCRIPTION OF EMBODIMENTS OF THE INVENTION

Figure 1:
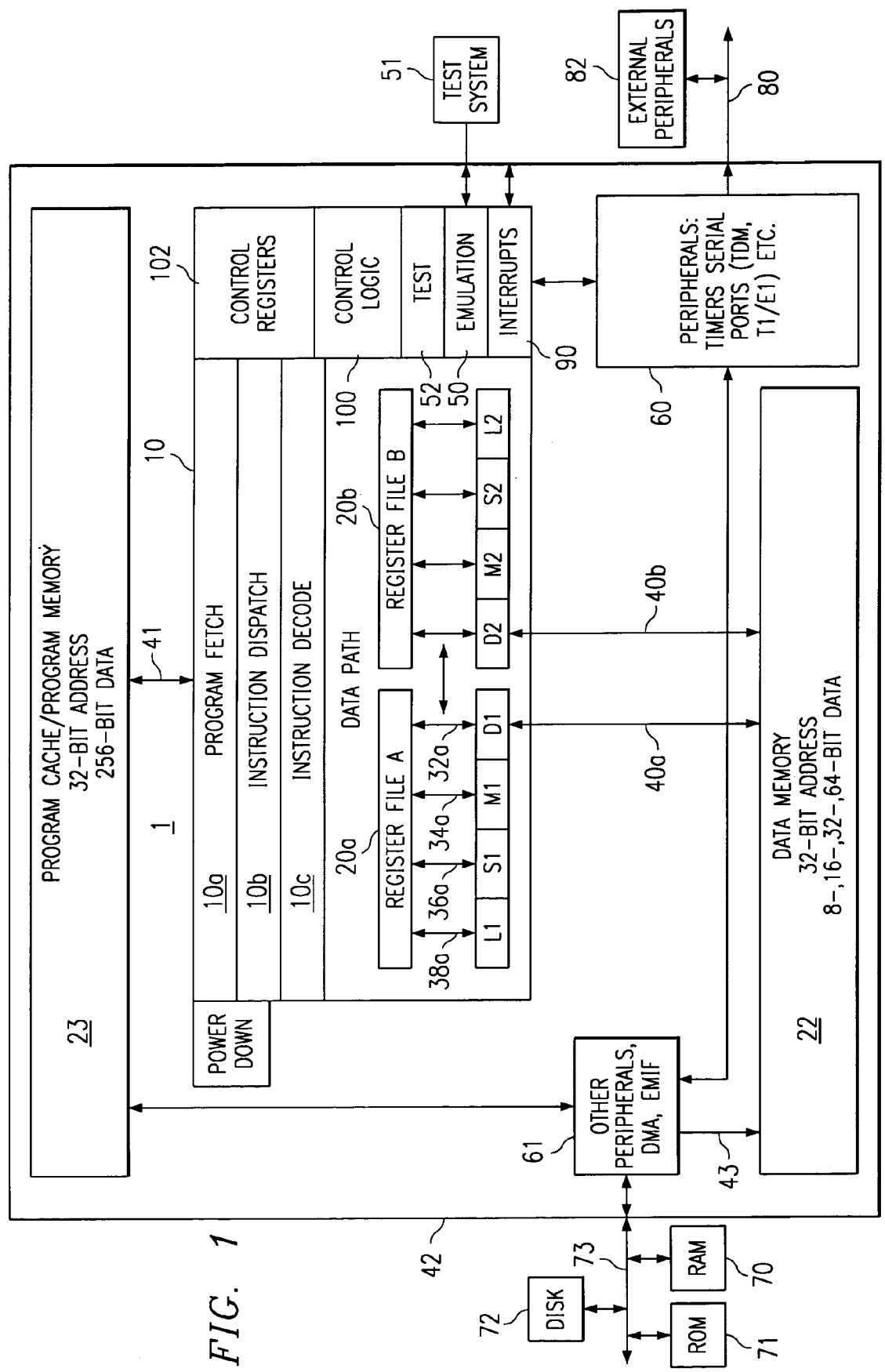
FIG. 1 is a block diagram of a digital signal processor (DSP), showing components thereof pertinent to an embodiment of the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multi-port register file 20a from which data are read and to which data are written. Decoded instructions are provided from the instruction fetch/decode unit 10a–c to the functional units D1, M1, S1, and L1 over various sets of control lines which are not shown. Data are provided to/from the register file 20a from/to load/store unit D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store unit D1 via a fifth set of busses 40a. Note that the entire data path described above is duplicated with register file 20b and execution units D2, M2, S2, and L2. Load/store unit D2 similarly interfaces with memory 22 via a set of busses 40b. Instructions are fetched by fetch unit 10a from instruction memory 23 over a set of busses 41. Emulation circuitry 50 provides access to the internal operation of integrated circuit 1 which can be controlled by an external test/development system (XDS) 51. Peripherals 60 connect to external peripherals 82 via bus 80. CPU 10 also includes interrupt controller 90, control logic 100 and configuration registers 102.

External test system 51 is representative of a variety of known test systems for debugging and emulating integrated circuits. One such system is described in U.S. Pat. No. 5,535,331 which is incorporated herein by reference. Test circuitry 52 contains control registers and parallel signature analysis circuitry for testing integrated circuit 1.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 42. A Direct Memory Access (DMA) controller is also included within block 61. The DMA controller part of functional block 61 connects to data memory 22 via bus 43 and is generally used to move data between memory and peripherals within microprocessor 1 and memory and peripherals which are external to microprocessor 1.

A detailed description of various architectural features of the microprocessor of FIG. 1 is provided in coassigned U.S. Pat. No. 6,182,203 and is incorporated herein by reference.

Figure 2:
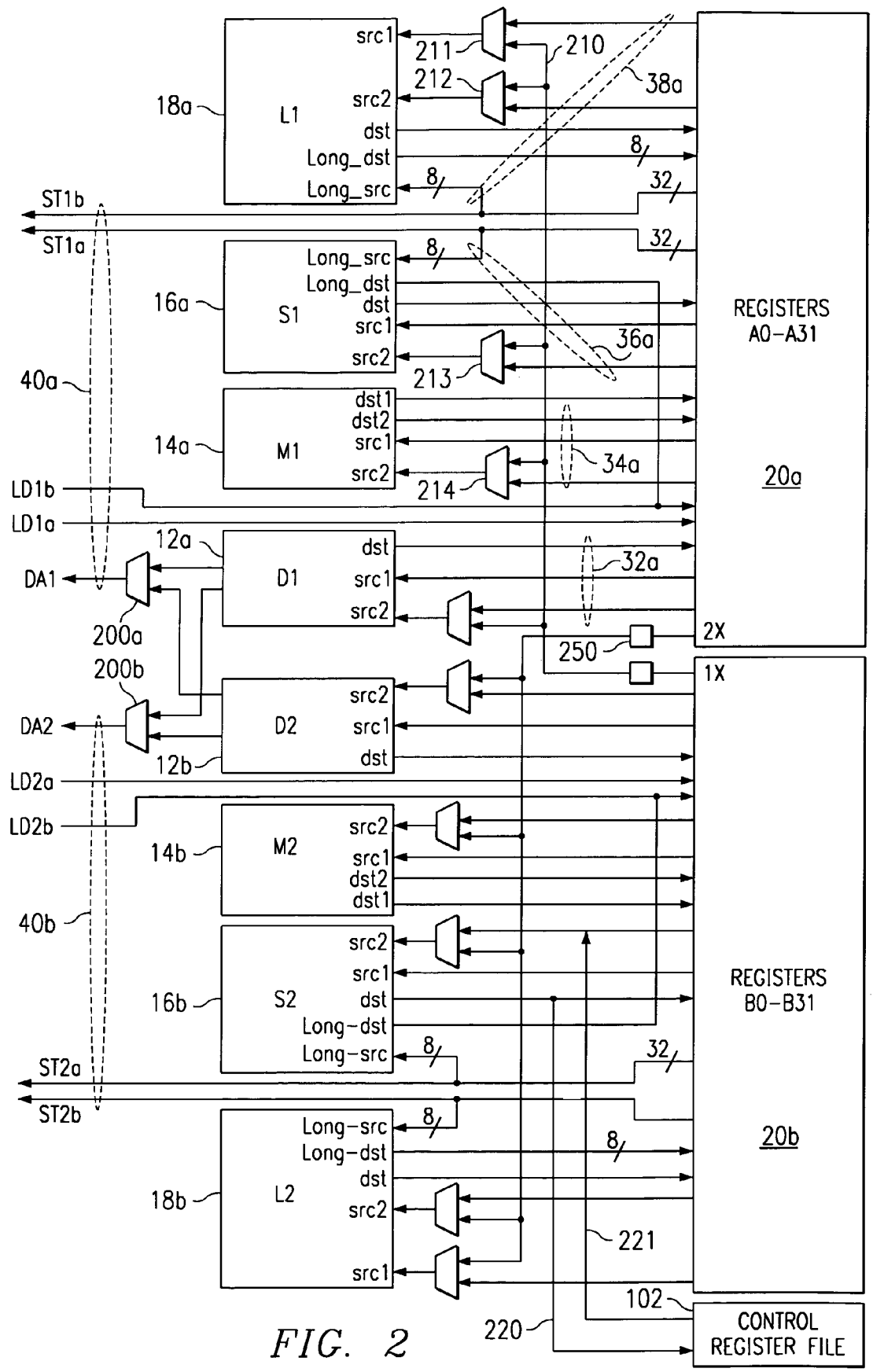
FIG. 2 is a block diagram of the functional units, data paths and register files of FIG. 1.

FIG. 2 is a block diagram of the execution units and register files of the microprocessor of FIG. 1 and shows a more detailed view of the buses connecting the various functional blocks. In this figure, all data busses are 32 bits wide, unless otherwise noted. There are two general-purpose register files (A and B) in the processor's data paths. Each of these files contains 32 32-bit registers (A0–A31 for register file A 20a and B0–B31 for register file B 20b). The general-purpose registers can be used for data, data address pointers, or condition registers. Any number of reads of a given register can be performed in a given cycle.

The general-purpose register files support data ranging in size from packed 8-bit data through 64-bit fixed-point data. Values larger than 32 bits, such as 40-bit long and 64-bit double word quantities, are stored in register pairs, with the 32 LSBs of data placed in an even-numbered register and the remaining 8 or 32 MSBs in the next upper register (which is always an odd-numbered register). Packed data types store either four 8-bit values or two 16-bit values in a single 32-bit register.

There are 32 valid register pairs for 40-bit and 64-bit data, as shown in Table 1. In assembly language syntax, a colon between the register names denotes the register pairs and the odd numbered register is specified first.

TABLE 1

40-Bit/64-Bit Register Pairs
Register Files

| A | B |
|---|---|
| A1:A0 | B1:B0 |
| A3:A2 | B3:B2 |
| A5:A4 | B5:B4 |
| A7:A6 | 67:B6 |
| A9:A8 | B9:B8 |
| A11:A10 | B11:B10 |
| A13:A12 | B13:B12 |
| A15:A14 | B15:B14 |
| A17:A16 | B17:B16 |
| A19:A18 | B19:B18 |
| A21:A20 | B21:B20 |
| A23:A22 | B23:B22 |
| A25:A24 | B25:B24 |
| A27:A26 | B27:B26 |
| A29:A28 | B29:B28 |
| A31:A30 | B31:B30 |

The eight functional units in processor 10's data paths can be divided into two groups of four; each functional unit in one data path is almost identical to the corresponding unit in the other data path. The functional units are described in Table 2.

Besides being able to perform 32-bit data manipulations, processor 10 also contains many 8-bit and 16-bit data instructions in the instruction set. For example, the MPYU4 instruction performs four 8×8 unsigned multiplies with a single instruction on an .M unit. The ADD4 instruction performs four 8-bit additions with a single instruction on an .L unit.

TABLE 2

Functional Units and Operations Performed

| Functional Unit | Fixed-Point Operations |
|---|---|
| .L unit (.L1, .L2) | 32/40-bit arithmetic and compare operations |
| | 32-bit logical operations |
| | Leftmost 1 or 0 counting for 32 bits |
| | Normalization count for 32 and 40 bits |
| | Byte shifts |
| | Data packing/unpacking |
| | 5-bit constant generation |
| | Paired 16-bit arithmetic operations |
| | Quad 8-bit arithmetic operations |
| | Paired 16-bit min/max operations |
| | Quad 8-bit min/max operations |
| .S unit (.S1, .S2) | 32-bit arithmetic operations |
| | 32/40-bit shifts and 32-bit bit-field operations |

TABLE 2-continued

Functional Units and Operations Performed

| Functional Unit | Fixed-Point Operations |
|---|---|
| | 32-bit logical operations |
| | Branches |
| | Constant generation |
| | Register transfers to/from control register file (.S2 only) |
| | Byte shifts |
| | Data packing/unpacking |
| | Paired 16-bit compare operations |
| | Quad 8-bit compare operations |
| | Paired 16-bit shift operations |
| | Paired 16-bit saturated arithmetic operations |
| | Quad 8-bit saturated arithmetic operations |
| .M unit (.M1, .M2) | 16 × 16 multiply operations |
| | 16 × 32 multiply operations |
| | Bit expansion |
| | Bit interleaving/de-interleaving |
| | Quad 8 × 8 multiply operations |
| | Paired 16 × 16 multiply operations |
| | Paired 16 × 16 multiply with add/subtract operations |
| | Quad 8 × 8 multiply with add operations |
| | Variable shift operations |
| | Rotation |
| | Galois Field Multiply |
| .D unit (.D1, .D2) | 32-bit add, subtract, linear and circular address calculation |
| | Loads and stores with 5-bit constant offset |
| | Loads and stores with 15-bit constant offset (.D2 only) |
| | Load and store double words with 5-bit constant |
| | Load and store non-aligned words and double words |
| | 5-bit constant generation |
| | 32-bit logical operations |

Most data lines in the CPU support 32-bit operands, and some support long (40-bit) and double word (64-bit) operands. Each functional unit has its own 32-bit write port into a general-purpose register file (Refer to FIG. 2). All units ending in 1 (for example, .L1) write to register file A 20a and all units ending in 2 write to register file B 20b. Each functional unit has two 32-bit read ports for source operands src1 and src2. Four units (.L1, .L2, .S1, and .S2) have an extra 8-bit-wide port for 40-bit long writes, as well as an 8-bit input for 40-bit long reads. Because each unit has its own 32-bit write port, when performing 32-bit operations all eight units can be used in parallel every cycle. Since each multiplier can return up to a 64-bit result, two write ports (dst1 and dst2) are provided from the multipliers to the respective register file.

Register File Cross Paths

Each functional unit reads directly from and writes directly to the register file within its own data path. That is, the .L1 unit 18a, .S1 unit 16a, .D1 unit 12a, and .M1 unit 14a write to register file A 20a and the .L2 unit 18b, .S2 unit 16b, .D2 unit 12b, and .M2 unit 14b write to register file B 20b. The register files are connected to the opposite-side register file's functional units via the 1X and 2X cross paths. These cross paths allow functional units from one data path to access a 32-bit operand from the opposite side's register file. The 1X cross path allows data path A's functional units to read their source from register file B. Similarly, the 2X cross path allows data path B's functional units to read their source from register file A.

All eight of the functional units have access to the opposite side's register file via a cross path. The .M1, .M2, .S1, .S2, .D1, and .D2 units' src2 inputs are selectable between the cross path and the same side register file. In the case of the .L1 and .L2 both src1 and src2 inputs are also selectable between the cross path and the same-side register file. Cross path 1X bus 210 couples one input of multiplexer 211 for src1 input of .L1 unit 18a, multiplexer 212 for src2 input of .L1 unit 18a, multiplexer 213 for src2 input of .S1 unit 16a and multiplexer 214 for scr2 input of .M1 unit 14a. Multiplexers 211, 212, 213, and 214 select between the cross path 1X bus 210 and an output of register file A 20a. Buffer 250 buffers cross path 2X output to similar multiplexers for .L2, .S2, .M2, and .D2 units.

Only two cross paths, 1X and 2X, exist in this embodiment of the architecture. Thus the limit is one source read from each data path's opposite register file per cycle, or a total of two cross-path source reads per cycle. Advantageously, multiple units on a side may read the same cross-path source simultaneously. Thus the cross path operand for one side may be used by any one, multiple or all the functional units on that side in an execute packet. In the C62x/C67x, only one functional unit per data path, per execute packet could get an operand from the opposite register file.

A delay clock cycle is introduced whenever an instruction attempts to read a register via a cross path that was updated in the previous cycle. This is known as a cross path stall. This stall is inserted automatically by the hardware; no NOP instruction is needed. It should be noted that no stall is introduced if the register being read is the destination for data loaded by a LDx instruction.

S2 unit 16b may write to control register file 102 from its dst output via bus 220. S2 unit 16b may read from control register file 102 to its src2 input via bus 221.

Memory, Load and Store Paths

Processor 10 supports double word loads and stores. There are four 32-bit paths for loading data for memory to the register file. For side A, LD1a is the load path for the 32 LSBs; LD1b is the load path for the 32 MSBs. For side B, LD2a is the load path for the 32 LSBs; LD2b is the load path for the 32 MSBs. There are also four 32-bit paths, for storing register values to memory from each register file. ST1a is the write path for the 32 LSBs on side A; ST1b is the write path for the 32 MSBs for side A. For side B, ST2a is the write path for the 32 LSBs; ST2b is the write path for the 32 MSBs.

Some of the ports for long and double word operands are shared between functional units. This places a constraint on which long or double word operations can be scheduled on a datapath in the same execute packet.

Data Address Paths

Bus 40a has an address bus DA1 which is driven by mux 200a. This allows an address generated by either load/store unit D1 or D2 to provide a memory address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1 via bus 40b, with the assistance of mux 200b for selecting an address.

The DA1 and DA2 resources and their associated data paths are specified as T1 and T2 respectively. T1 consists of the DA1 address path and the LD1a, LD1b, ST1a and ST1b data paths. Similarly, T2 consists of the DA2 address path and the LD2a, LD2b, ST2a and ST2b data paths. The T1 and T2 designations appear in functional unit fields for load and store instructions.

For example, the following load instruction uses the .D1 unit to generate the address but is using the LD2a path resource from DA2 to place the data in the B register file. The use of the DA2 resource is indicated with the T2 designation.

LDW .D1T2*A0[3], B1

Table 3 defines the mapping between instructions and functional units for a set of basic instructions included in DSP 10 is described in U.S. Pat. No. 6,182,203 incorporated herein by reference). Table 4 defines a mapping between instructions and functional units for a set of extended instructions in an embodiment of the present invention. A complete description of the extended instructions is provided in U.S. patent application Ser. No. 09/703,096 entitled "Microprocessor with Improved ISA," and is incorporated herein by reference. Alternative embodiments of the present invention may have different sets of instructions and functional unit mapping. Table 3 and Table 4 are illustrative and are not exhaustive or intended to limit various embodiments of the present invention.

TABLE 3

Instruction to Functional Unit Mapping of Basic Instructions

| .L Unit | .M Unit | .S Unit | .D Unit |
|---------|---------|---------|---------|
| ABS | MPY | ADD | ADD |
| ADD | SMPY | ADDK | ADDA |
| AND |  | ADD2 | LD mem |
| CMPEQ |  | AND | LD mem (15-bit offset) (D2 only) |
| CMPGT |  | B disp | MV |
| CMPGTU |  | B IRP | NEG |
| CMPLT |  | B NRP | ST mem |
| CMPLTU |  | B reg | ST mem (15-bit offset) (D2 only) |
| LMBD |  | CLR | SUB |
| MV |  | EXT | SUBA |
| NEG |  | EXTU | ZERO |
| NORM |  | MVC |  |
| NOT |  | MV |  |
| OR |  | MVK |  |
| SADD |  | MVKH |  |
| SAT |  | NEG |  |
| SSUB |  | NOT |  |
| SUB |  | OR |  |
| SUBC |  | SET |  |
| XOR |  | SHL |  |
| ZERO |  | SHR |  |
|  |  | SHRU |  |
|  |  | SSHL |  |
|  |  | STP (S2 only) |  |
|  |  | SUB |  |
|  |  | SUB2 |  |
|  |  | XOR |  |
|  |  | ZERO |  |

TABLE 4

Instruction to Functional Unit Mapping of Extended Instructions

| .L unit | .M unit | .S unit | .D unit |
|---------|---------|---------|---------|
| ABS2 | AVG2 | ADD2 | ADD2 |
| ADD2 | AVGU4 | ADDKPC | AND |
| ADD4 | BITC4 | AND | ANDN |
| AND | BITR | ANDN | LDDW |
| ANDN | DEAL | BDEC | LDNDW |
| MAX2 | DOTP2 | BNOP | LDNW |
| MAXU4 | DOTPN2 | BPOS | MVK |

TABLE 4-continued

Instruction to Functional Unit Mapping of Extended Instructions

| .L unit | .M unit | .S unit | .D unit |
|---|---|---|---|
| MIN2 | DOTPNRSU2 | CMPEQ2 | OR |
| MINU4 | DOTPNRUS2 | CMPEQ4 | STDW |
|  | DOTPRSU2 | CMPGT2 |  |
|  | DOTPRUS2 | CMPGTU4 |  |
| MVK | DOTPSU4 | CMPLT2 | STNDW |
|  | DOTPUS4 |  |  |
| OR | DOTPU4 | CMPLTU4 | STNW |
| PACK2 | GMPY4 | MVK | SUB2 |
| PACKH2 | MPY2 | OR | XOR |
| PACKH4 | MPYHI | PACK2 |  |
| PACKHL2 | MPYHIR | PACKH2 |  |
|  | MPYIH |  |  |
|  | MPYIHR |  |  |
| PACKL4 | MPYIL | PACKHL2 |  |
|  | MPYILR |  |  |
|  | MPYLI |  |  |
| PACKLH2 | MPYLIR | PACKLH2 |  |
| SHLMB | MPYSU4 | SADD2 |  |
|  | MPYUS4 |  |  |
| SHRMB | MPYU4 | SADDU4 |  |
| SUB2 | MVD | SADDSU2 |  |
|  |  | SADDUS2 |  |
| SUB4 | ROTL | SHLMB |  |
| SUBABS4 | SHFL | SHR2 |  |
| SWAP2 | SMPY2 | SHRMB |  |
| SWAF4 | SSHVL | SHRU2 |  |
| UNPKHU4 | SSHVR | SPACK2 |  |
| UNPKLU4 | XPND2 | SPACKU4 |  |
| XOR | XPND4 | SUB2 |  |
|  |  | SWAP2 |  |
|  |  | UNPKHU4 |  |
|  |  | UNPKLU4 |  |
|  |  | XOR |  |

Instructions are always fetched eight at a time. This constitutes a fetch packet. The basic format of a fetch packet is shown in FIG. 3. The execution grouping of the fetch packet is specified by the p-bit, bit zero, of each instruction. Fetch packets are 8-word aligned.

The p-bit controls the parallel execution of instructions. The p-bits are scanned from left to right (lower to higher address). If the p-bit of instruction i is 1, then instruction i+1 is to be executed in parallel with (in the same cycle as) instruction i. If the p-bit of instruction i is 0, then instruction i+1 is executed in the cycle after instruction i. All instructions executing in parallel constitute an execute packet. An execute packet in this embodiment can contain up to eight instructions. All instructions in an execute packet must use a unique functional unit.

The following examples illustrate the conversion of a p-bit sequence into a cycle-by-cycle execution stream of instructions. There are three types of p-bit patterns for fetch packets. These three p-bit patterns result in the following execution sequences for the eight instructions: fully serial; fully parallel; or partially serial. These three sequences of execution are explained more fully below.

The fully serial p-bit pattern depicted in FIG. 4A results in this execution sequence is illustrated in Table 5.

TABLE 5

Fully Serial p-bit Pattern Execution Sequence

| Cycle | Instructions |
|---|---|
| 1 | A |
| 2 | B |

TABLE 5-continued

Fully Serial p-bit Pattern Execution Sequence

| Cycle | Instructions |
|---|---|
| 3 | C |
| 4 | D |
| 5 | E |
| 6 | F |
| 7 | G |
| 8 | H |

The eight instructions are executed sequentially.

The fully parallel p-bit pattern depicted in FIG. 4B results in this execution sequence is illustrated in Table 6.

TABLE 6

Fully Parallel p-bit Pattern Execution Sequence

| Cycle | Instructions | | | | | | | |
|---|---|---|---|---|---|---|---|---|
| 1 | A | B | C | D | E | F | G | H |

All eight instructions are executed in parallel.

The partially serial p-bit pattern depicted in FIG. 4C results in this execution sequence is illustrated in Table 7.

TABLE 7

Partially Serial p-bit Pattern Execution Sequence

| Cycle | Instructions | | |
|---|---|---|---|
| 1 | A | | |
| 2 | B | | |
| 3 | C | D | E |
| 4 | F | G | H |

Note that the instructions C, D, and E do not use any of the same functional units, cross paths, or other data path resources. This is also true for instructions F, G, and H.

The ‖ characters signify that an instruction is to execute in parallel with the previous instruction. In the previous partially serial example, the code would be represented as this:

|  | instruction | A |
|---|---|---|
|  | instruction | B |
|  | instruction | C |
| ‖ | instruction | D |
| ‖ | instruction | E |
|  | instruction | F |
| ‖ | instruction | G |
| ‖ | instruction | H |

If a branch into the middle of an execution packet occurs, all instructions at lower addresses are ignored. In the partially serial example, if a branch to the address containing instruction D occurs, then only D and E will execute. Even though instruction C is in the same execute packet, it is ignored. Instructions A and B are also ignored because they are in earlier execute packets.

No two instructions within the same execute packet can use the same resources. Also, no two instructions can write to the same register during the same cycle. The following describes each of the resources an instruction can use.

Two instructions using the same functional unit cannot be issued in the same execute packet.

| The following execute packet is invalid in the present embodiment: | | |
|---|---|---|
| ADD .S1 | A0, A1, A2 | ; \ .S1 is used for both instructions |
| ‖ SHR .S1 | A3, 15, A4 | ; / |
| The following execute packet is valid in the present embodiment: | | |
| ADD .L1 | A0, A1, A2 | ; \ Two different functional units |
| ‖ SHR .S1 | A3, 15, A4 | ; / are used |

Unprotected Pipeline

Since the pipeline of the present embodiment is unprotected, certain code sequences that cause resource conflicts are invalid. An assembler with appropriate code sequence checking capabilities is used to screen out invalid code sequences. Several constraints related to the present embodiment are described below. Other constraints which may apply to the present embodiment are described in U.S. Pat. No. 6,112,298, incorporated herein by reference.

Pipeline Operation

The DSP pipeline has several key features which improve performance, decrease cost, and simplify programming. They are: increased pipelining eliminates traditional architectural bottlenecks in program fetch, data access, and multiply operations; control of the pipeline is simplified by eliminating pipeline interlocks; the pipeline can dispatch eight parallel instructions every cycle; parallel instructions proceed simultaneously through the same pipeline phases; sequential instructions proceed with the same relative pipeline phase difference; and load and store addresses appear on the CPU boundary during the same pipeline phase, eliminating read-after-write memory conflicts.

A multi-stage memory pipeline is present for both data accesses and program fetches. This allows use of high-speed synchronous memories both on-chip and off-chip, and allows infinitely nestable zero-overhead looping with branches in parallel with other instructions.

There are no internal interlocks in the execution cycles of the pipeline, so a new execute packet enters execution every CPU cycle. Therefore, the number of CPU cycles for a particular algorithm with particular input data is fixed. If during program execution, there are no memory stalls, the number of CPU cycles equals the number of clock cycles for a program to execute.

Performance can be inhibited only by stalls from the memory subsystems or interrupts. The reasons for memory stalls are determined by the memory architecture. To fully understand how to optimize a program for speed, the sequence of program fetch, data store, and data load requests the program makes, and how they might stall the CPU should be understood.

The pipeline operation, from a functional point of view, is based on CPU cycles. A CPU cycle is the period during which a particular execute packet is in a particular pipeline stage. CPU cycle boundaries always occur at clock cycle boundaries; however, memory stalls can cause CPU cycles to extend over multiple clock cycles. To understand the machine state at CPU cycle boundaries, one must be concerned only with the execution phases (E1–E5) of the pipeline. The phases of the pipeline are shown in FIG. 5 and described in Table 8.

TABLE 8

Pipeline Phase Description

| Pipeline | Pipeline Phase | Symbol | During This Phase | Instruction Types Completed |
|---|---|---|---|---|
| Program Fetch | Program Address Generate | PG | Address of the fetch packet is determined. | |
| | Program Address Send | PS | Address of fetch packet is sent to memory. | |
| | Program Wait | PW | Program memory access is performed. | |
| | Program Data Receive | PR | Fetch packet is expected at CPU boundary. | |
| Program Decode | Dispatch | DP | Next execute packet in fetch packet determined and sent to the appropriate functional units to be decoded. | |
| | Decode | DC | Instructions are decoded at functional units. | |
| Execute | Execute 1 | E1 | For all instruction types, conditions for instructions are evaluated and operands read. | Single-cycle |
| | | | Load and store instructions: address generation is computed and address modifications written to register file[†] | |
| | | | Branch instructions: affects branch fetch packet in PG phase[†] | |
| | | | Single-cycle instructions: results are written to a register file[†] | |
| | Execute 2 | E2 | Load instructions: address is sent to memory[†] | Stores |
| | | | Store instructions and STP: address and data are sent to memory[†] | STP |
| | | | | Multiplies |
| | | | Single-cycle instructions that saturate results set the SAT bit in the Control Status Register (CSR) if saturation occurs.[†] | |
| | | | Multiply instructions: results are written to a register file[†] | |
| | Execute 3 | E3 | Data memory accesses are performed. Any multiply instruction that saturates results sets the SAT bit in the Control Status Register (CSR) if saturation occurs.[†] | |

TABLE 8-continued

Pipeline Phase Description

| Pipeline | Pipeline Phase | Symbol | During This Phase | Instruction Types Completed |
|---|---|---|---|---|
| | Execute 4 | E4 | Load instructions: data is brought to CPU boundary[†] | |
| | Execute 5 | E5 | Load instructions: data is loaded into register[†] | Loads |

[†]This assumes that the conditions for the instructions are evaluated as true. If the condition is evaluated as false, the instruction will not write any results or have any pipeline operation after E1.

The pipeline operation of the instructions can be categorized into seven types shown in Table 9. The delay slots for each instruction type are listed in the second column.

TABLE 9

Delay Slot Summary

| Instruction Type | Delay Slots | Execute Stages Used |
|---|---|---|
| Branch (The cycle when the target enters E1) | 5 | E1-branch target E1 |
| Load (LD) (Incoming Data) | 4 | E1–E5 |
| Load (LD) (Address Modification) | 0 | E1 |
| Multiply | 1 | E1–E2 |
| Single-cycle | 0 | E1 |
| Store | 0 | E1 |
| NOP (no execution pipeline operation) | — | — |
| STP (no CPU internal results written) | — | — |

The execution of instructions can be defined in terms of delay slots (Table 9). A delay slot is a CPU cycle that occurs after the first execution phase (E1) of an instruction in which results from the instruction are not available. For example, a multiply instruction has 1 delay slot, this means that there is 1 CPU cycle before another instruction can use the results from the multiply instruction.

Single cycle instructions execute during the E1 phase of the pipeline. The operand is read, operation is performed and the results are written to a register all during E1. These instructions have no delay slots.

Multiply instructions complete their operations during the E2 phase of the pipeline. In the E1 phase, the operand is read and the multiply begins. In the E2 phase, the multiply finishes, and the result is written to the destination (dst) register. Multiply instructions have 1 delay slot.

Load instructions have two results: data loaded from memory and address pointer modification.

Data loads complete their operations during the E5 phase of the pipeline. In the E1 phase, the address of the data is computed. In the E2 phase, the data address is sent to data memory. In the E3 phase, a memory read is performed. In the E4 stage, the data is received at the CPU core boundary. Finally, in the E5 phase, the data is loaded into a register. Because data is not written to the register until E5, these instructions have 4 delay slots. Because pointer results are written to the register in E1, there are no delay slots associated with the address modification.

Store instructions complete their operations during the E3 phase of the pipeline. In the E1 phase, the address of the data is computed. In the E2 phase, the data address is sent to data memory. In the E3 phase, a memory write is performed. The address modification is performed in the E1 stage of the pipeline. Even though stores finish their execution in the E3 phase of the pipeline, they have no delay slots and follow the following rules (i=cycle):

1) When a load is executed before a store, the old value is loaded and the new value is stored.
   i LDW
   i+1 STW
2) When a store is executed before a load, the new value is stored and the new value is loaded.
   i STW
   i+1 LDW
3) When the instructions are in are in parallel, the old value is loaded and the new value is stored.

| i | | STW |
|---|---|---|
| i + 1 | ‖ | LDW |

Branch instructions execute during the E1 phase of the pipeline five delay slots/CPU cycles after the branch instruction enters an initial E1 phase of the pipeline. FIG. 5 shows the operation of the pipeline based on clock cycles and fetch packets. In FIG. 5, if a branch is in fetch packet n, then the E1 phase of the branch is the PG phase of n+6. In cycle 7 n is in the E1 phase and n+6 is in the PG phase. Because the branch target is in PG on cycle 7, it will not reach E1 until cycle 13. Thus, it appears as if the branch takes six cycles to execute, or has five delay slots.

In FIG. 5, fetch packet n, which contains three execute packets, is shown followed by six fetch packets (n+1 through n+6), each with one execution packet (containing 8 parallel instructions). The first fetch packet (n) goes through the program fetch phases during cycles 1–4. During these cycles a program fetch phase is started for each of the following fetch packets.

In cycle 5, the program dispatch (DP) phase, the CPU scans the p-bits and detects that there are three execute packets (k thru k+2) in fetch packet n. This forces the pipeline to stall, which allows the DP phase to start execute packets k+1 and k+2 in cycles 6 and 7. Once execute packet k+2 is ready to move on to the DC phase (cycle 8) the pipeline stall is released.

The fetch packets n+1 through n+4 were all stalled so the CPU would have time to perform the DP phase for each of the three execute packets (k thru k+2) in fetch packet n. Fetch packet n+5 was also stalled in cycles 6 and 7; it was not allowed to enter the PG phase until after the pipeline stall was released in cycle 8. The pipeline will continue as shown with fetch packets n+5 and n+6 until another fetch packet containing multiple execution packets enters the DP phase, or an interrupt occurs.

Figure 6:
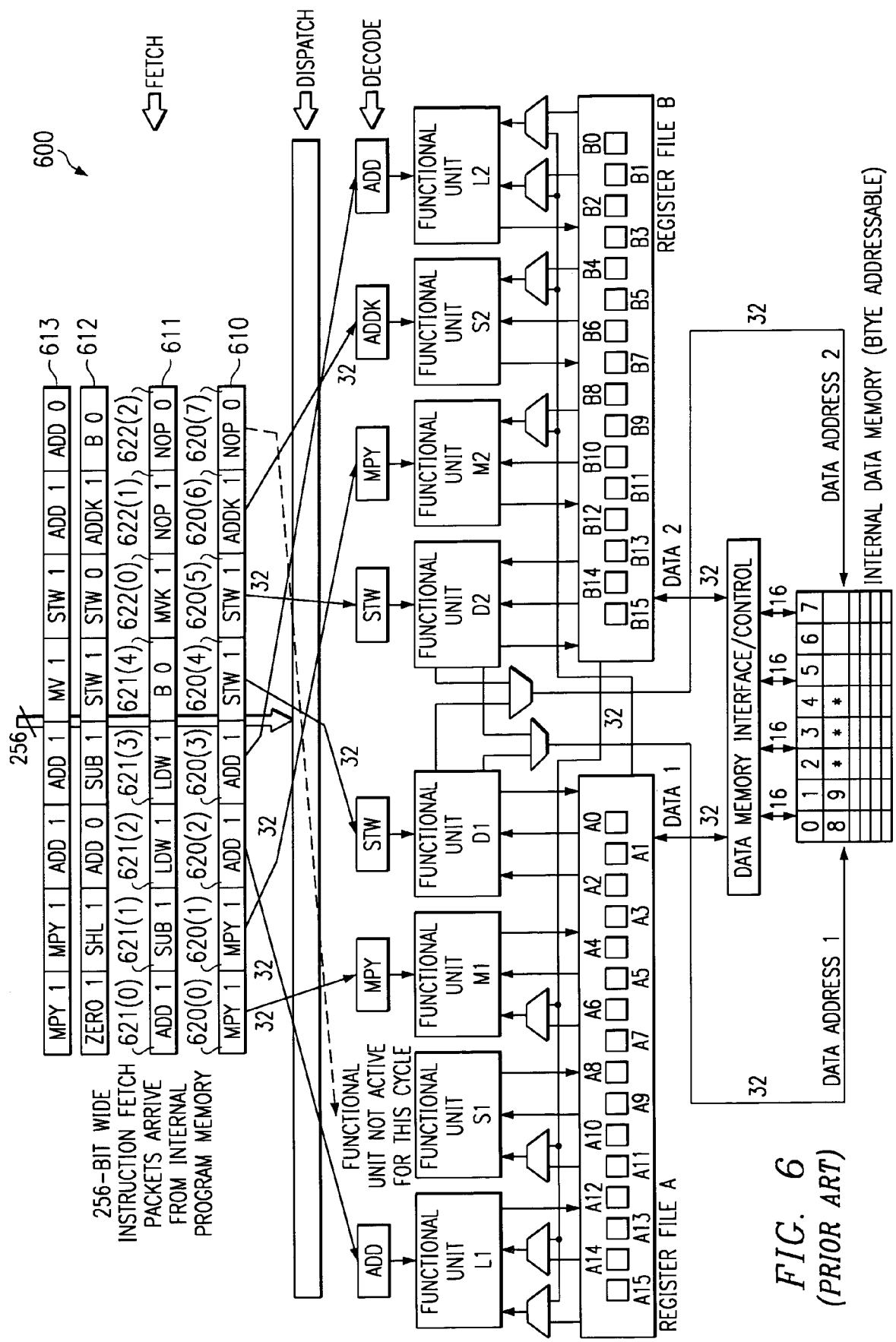
FIG. 6 is a block diagram of a prior art processor, illustrating how execution packets must be aligned within fetch packets.

FIG. 6 is a block diagram illustrating a prior art processor 600 that requires execution packets to be aligned within fetch packets. Prior art processor 600 is a VLIW RISC architecture that has an instruction execution pipeline that operates similarly to processor 10 in aspects other than execution packet alignment. Four fetch packets 610–613 are illustrated in FIG. 6. These are each fetched sequentially in response to program fetch circuitry in processor 600. Fetch packet 610 comprises an execution packet 620 that has seven useful instructions 620(0)–620(6) that can all be executed in parallel. The next execution packet 621 is in fetch packet 611 and comprises instructions 621(0)–621(4). A third execution packet 622 comprises one useful instruction 622(0). Disadvantageously, a no-operation instruction (NOP) 620(7) must be included in execution packet 620 since execution packets must be aligned within fetch packets. Similarly, NOP instructions 622(1) and 622(2) are placed in execution packet 622 to cause alignment with fetch packet 611. NOP instructions 620(7), 622(1) and 622(2) waste storage resources in processor 600. Note that the last word of each fetch packet has the p-bit set to 0 to indicate the end of an execute packet, such as instruction word 620(7) and 622(2), for example.

FIG. 7A is another illustration of fetch packets and execution packets in prior art processor 600 of FIG. 6. If an execution packet did not fit evenly within a fetch packet, NOP instructions were inserted in the instruction stream to pad out the fetch packet. For example, in FIG. 7A, execution packet E3 cannot fit in the four-word space directly after execution packet E2, therefore four NOP instructions are inserted in the instruction sequence to pad out the fetch packet. Disadvantageously, instruction storage resources are wasted and unexecutable NOP instructions are needlessly fetched.

FIG. 7B is an illustration of execution packets spanning fetch packets for the processor of FIG. 1. Advantageously, in the present embodiment of processor 10, an execution packet can cross an eight-word fetch packet boundary, thereby eliminating a need to add NOP instructions to pad fetch packets. For example, eight-word execution packet EP1 completely occupies fetch packet 700. Four-word execution packet EP2 partially fills fetch packet 702. Six-word execution packet EP3 does not fit completely within fetch packet 702, however, the first four words EP3(0)–EP3(3) are placed in fetch packet 702 and the last two words EP3(4), EP3(5) are placed in fetch packet 704. Therefore, the last p-bit in a fetch packet is not always set to 0 in processor 10. If the last p-bit of a fetch packet is not zero, then instruction fetch control circuitry in stage 10a (FIG. 1) fetches a second fetch packet and extracts instruction words until a p-bit set to 0 is encountered. This sequence of instruction words is then ordered into a single execution packet, such as execution packet EP3, for example.

Figure 8:
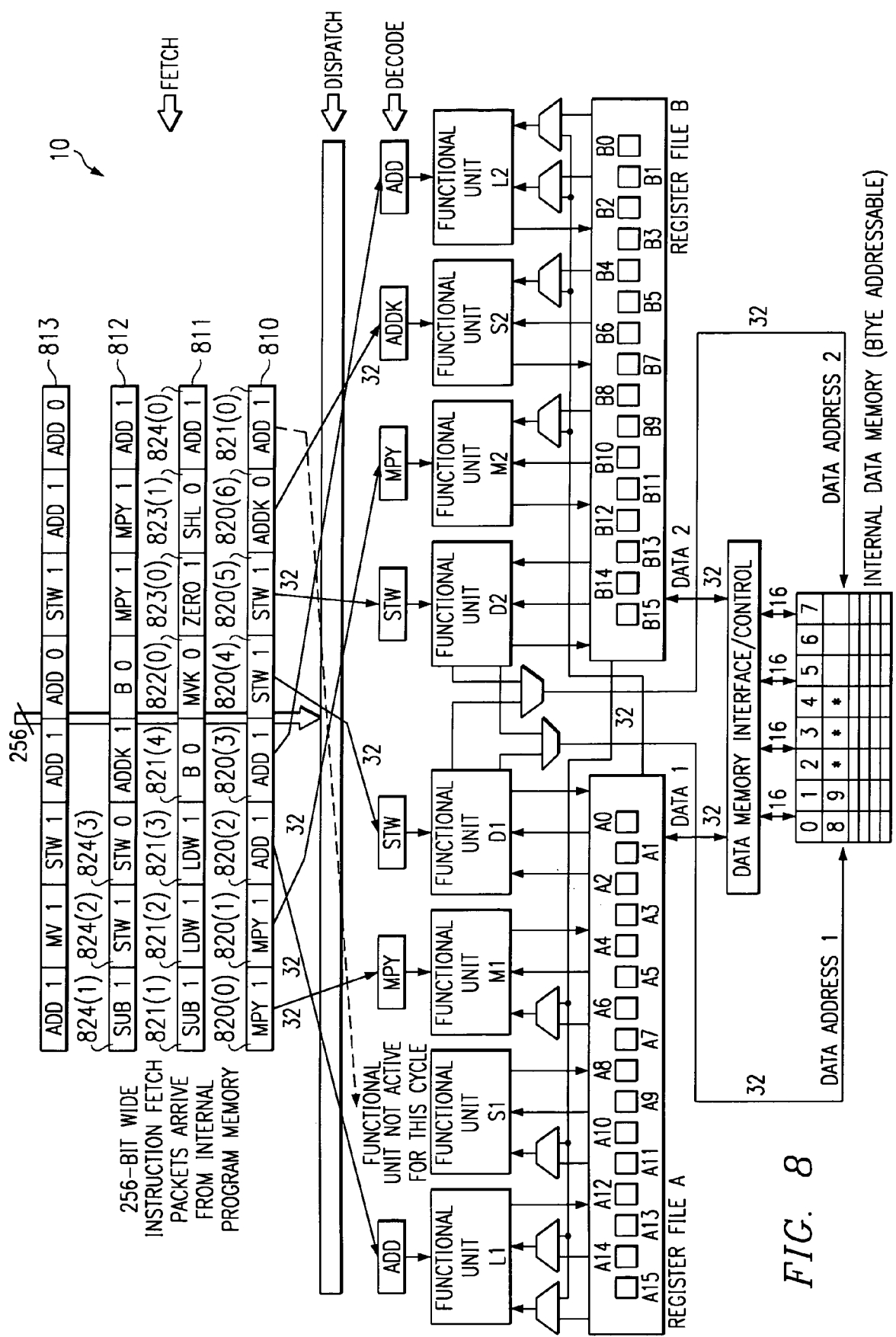
FIG. 8 is a block diagram of the processor of FIG. 1, illustrating a sequence of execution packets spanning fetch packets.

FIG. 8 is a block diagram of processor 10 of FIG. 1, illustrating a sequence of execution packets spanning fetch packets 810–813, according to an aspect of the present invention. For ease of comparison, the same program portion is illustrated here as in FIG. 6. For example, execution packet 820 comprises only the seven useful instructions 820(0)–820(6). The last instruction word 820(6) has the p-bit set to 0. Advantageously, the first word 821(0) of execution packet 821 is now placed in fetch packet 810. Note that the p-bit of instruction word 821(0) is set to 1 to indicate that execute packet 821 continues to the next fetch packet 811 where instruction words 821(1)–821(4) are located. Likewise, execution packet 824 spans fetch packets 811 and 812 with instruction word 824(0) located in fetch packet 811 and instruction words 824(1)–824(3) located in fetch packet 812. Execution packet 822 with instruction word 822(0) is located within fetch packet 811. Execution packet 823 with instruction words 823(0)–823(1) is located within fetch packet 811. Note that the last word of the fetch packet now does not necessarily have the p-bit set to 0, for example instruction words 821(0) and 824(0) both have their p-bit set to one indicating that their associated execution packet spans to the next fetch packet.

Figure 9:
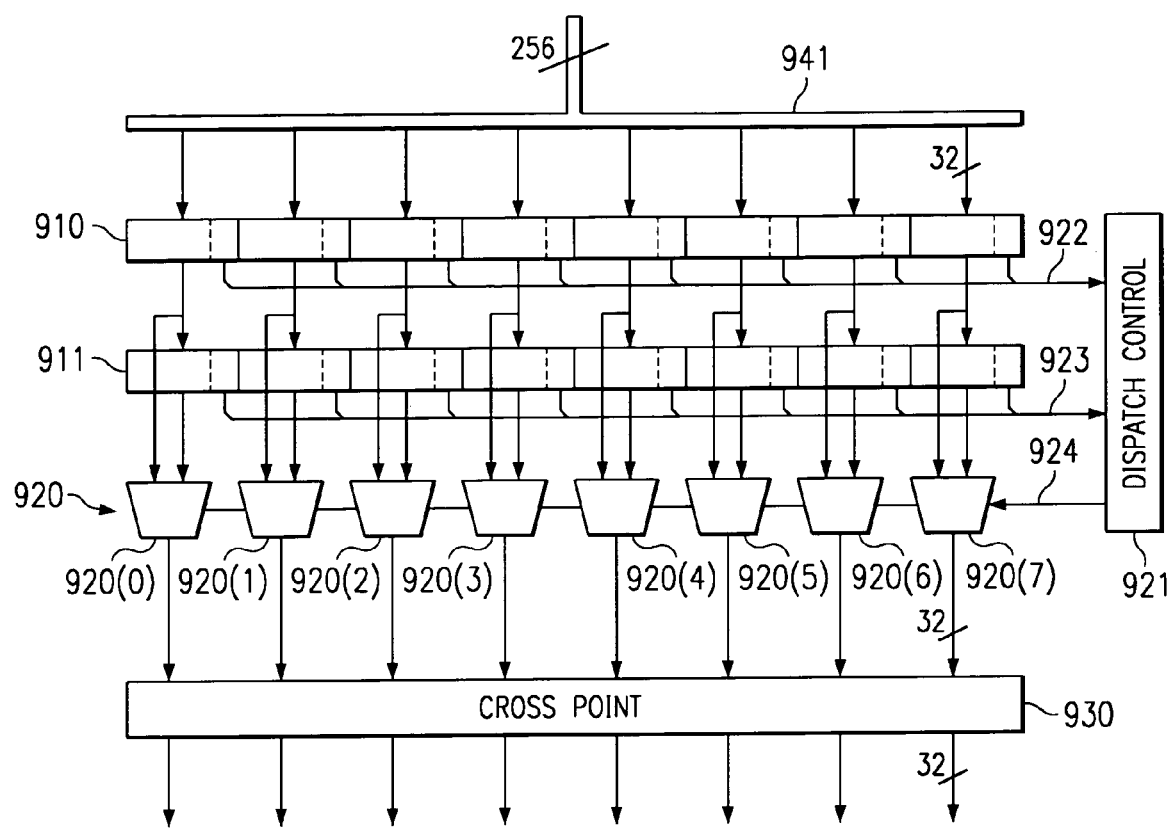
FIG. 9 is a block diagram of a portion of the instruction fetch pipeline of the processor of FIG. 1 that illustrates circuitry for dispatching an execution packet that spans two fetch packets.

FIG. 9 is a block diagram of a portion of instruction fetch pipeline stages 10a–10c of processor 10 of FIG. 1 that illustrates circuitry for dispatching an execution packet that spans two fetch packets. An eight word fetch packet is received on instruction data bus 941 from an instruction memory/cache into a first latch stage 910. A second latch stage 911 receives the first fetch packet on the next clock cycle while a second fetch packet is received simultaneously into latch stage 910. Multiplexor set 920 has eight individually controlled multiplexors 920(0)–920(7) that each have a first input connected to receive a 32-bit instruction word from first latch stage 910 and a 32-bit instruction word from second latch stage 911. Dispatch control circuitry 921 monitors the p-bit associated with each of the eight instructions in latch stage 910 via p-bit signals 922. An execution packet within latch stage 910 is selected by appropriate controls signals 924 asserted by dispatch control circuitry 921 to multiplexor set 920 and is passed thereby to crosspoint circuitry 930 and on to the various decode circuitry associated with the execution units of processor 10, as illustrated in FIG. 8.

If a first execution packet does not entirely fill the first fetch packet, then the second execution packet is selected from second latch stage 911 on a following clock cycle. Dispatch control circuitry 921 monitors second stage p-bit signals 923 and asserts controls signals 924 appropriately to multiplexor set 920 to select the second execution packet from latch stage 911 and it is passed thereby to crosspoint circuitry 930 and on to the various decode/execution units of processor 10.

If the second execute packet spans the first and second fetch packets, then a first portion of the second execute packet is selected from latch stage 911 and a remaining portion is selected from latch stage 910. Dispatch control circuitry 921 monitors p-bit signals 922 and 923 and asserts control signals 924 appropriately so that multiplexor set 920 selects the first portion of the second execute packet from latch stage 911 and the remaining portion from latch stage 910.

Thus, control circuitry 921 is connected to a plurality of instruction positions corresponding to the plurality of instructions of a fetch packet in latch stage 910 and latch stage 911 to determine a boundary of each execute packet. The control circuitry is operable to control selection circuitry 920 in response to an execute packet boundary.

A sequence of instruction fetch packets is fetched, wherein each fetch packet contains a first plurality of instructions. Each fetch packet is examined to determine an execution packet boundary and then a first portion of an execute packet is selected from a first fetch packet and a second portion of a first execute packet from a second fetch packet if the first execute packet boundaries span the first fetch packet and the second fetch packet.

Fetch pipe stalls are generated as needed, as discussed with reference to FIG. 5, if latch stage 910 is not free when a fetch packet arrives on instruction bus 941.

Figure 10:
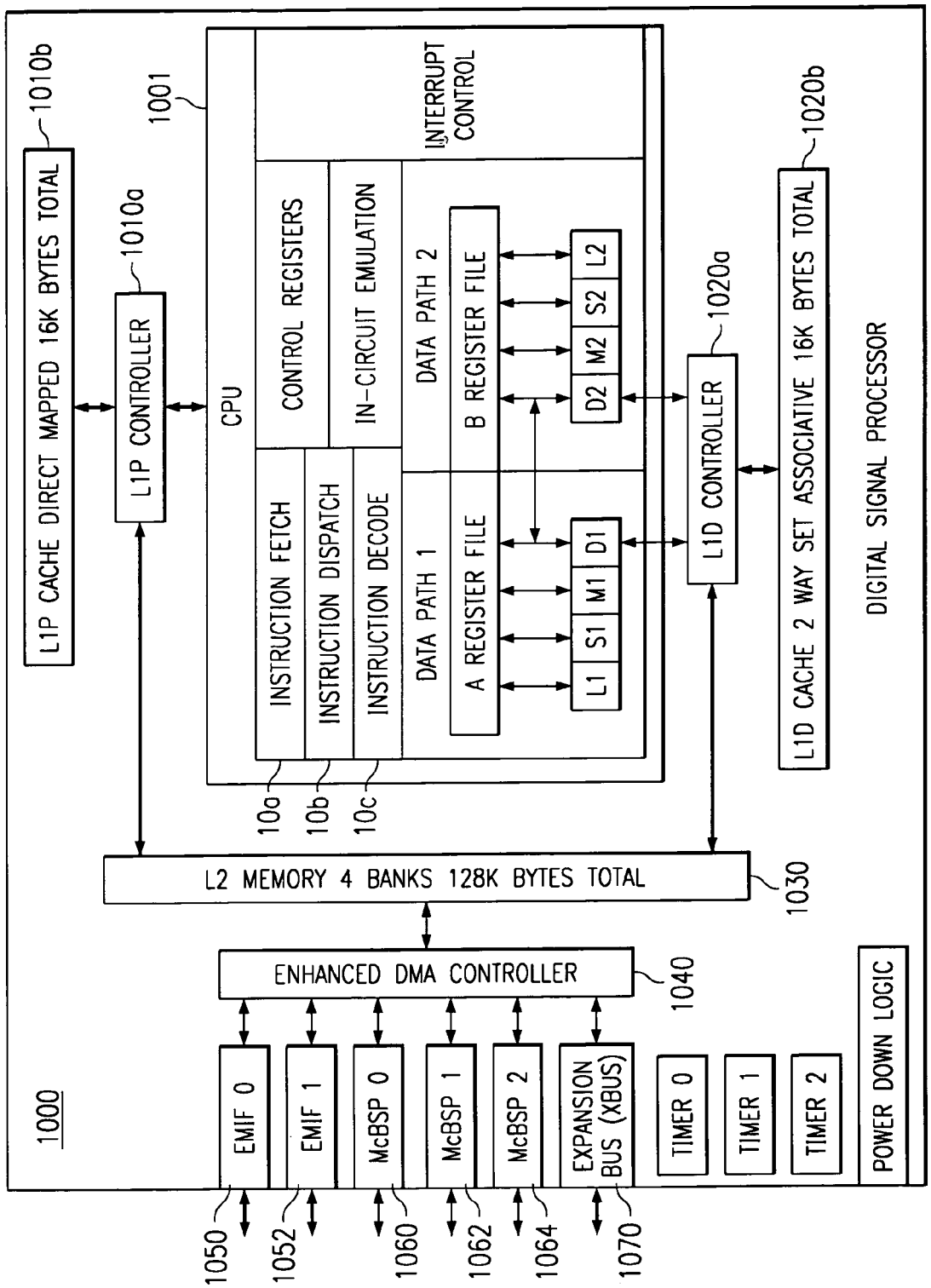
FIG. 10 is a block diagram of an alternative embodiment of the processor of FIG. 1.

FIG. 10 is a block diagram of an alternative embodiment of a digital system 1000 with processor core 1001 similar to processor core 10 of FIG. 1. A direct mapped program cache 1010b, having 16 kbytes capacity, is controlled by L1

Program (L1P) controller 1010a and connected thereby to the instruction fetch stage 10a. A 2-way set associative data cache 1020b, having a 16 kbyte capacity, is controlled by L1 Data (L1D) controller 1020a and connected thereby to data units D1 and D2. An L2 memory/cache 1030 having four banks of memory, 128 Kbytes total, is connected to L1P 1010a and to L1D 1020a to provide storage for data and programs. External memory interface (EMIF) 1050 provides a 64-bit data path to external memory, not shown, which provides memory data to L2 memory 1030 via extended direct memory access (DMA) controller 1040.

EMIF 1052 provides a 16-bit interface for access to external peripherals, not shown. Expansion bus 1070 provides host and I/O support similarly to host port 60/80 of FIG. 1.

Three multi-channel buffered serial ports (McBSP) 1060, 1062, 1064 are connected to DMA controller 1040. A detailed description of a McBSP is provided in U.S. Pat. No. 6,167,466 and is incorporated herein reference.

The Very Long Instruction Word (VLIW) CPU of the present invention uses a 256-bit wide instruction to feed up to eight 32-bit instructions to the eight functional units during every clock cycle. The VLIW architecture features controls by which all eight units do not have to be supplied with instructions if they are not ready to execute. The first bit of every 32-bit instruction determines if the next instruction belongs to the same execute packet as previous instruction, or whether it should be executed in the following clock as a part of the next execute packet. While fetch packets are always 256-bit wide, execute packets can vary in size as shown with reference to FIGS. 4A–4C. Variable length execute packets are a key memory saving feature distinguishing CPU 1001 from other VLIW architectures.

Advantageously, instruction fetch stage 10a and dispatch stage 10b are constructed according to FIG. 9 such that an execution packet can span two fetch packets. Advantageously, NOP instructions are not needed to maintain execution packet alignment in processor 1001.

Other Systems

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

Figure 11:
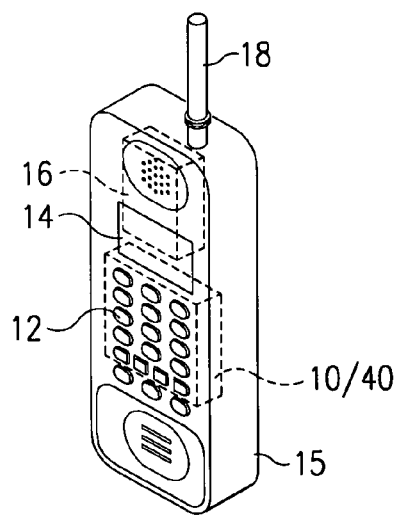
FIG. 11 is a wireless telephone that embodies the present invention.

FIG. 11 illustrates an exemplary implementation of an example of an integrated circuit 40 that includes digital system 1000 in a mobile telecommunications device, such as a wireless telephone 15 with integrated keyboard 12 and display 14. As shown in FIG. 11 digital system 1000 with processor 10 (co-located with integrated circuit 40) is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18. Advantageously, by allowing execute packets to span fetch packets, memory is not wasted with useless NOP instructions. Thus, a smaller memory can be included within the wireless telephone and fewer fetch cycles are required for execution of a given processing algorithm and power consumption is thereby reduced.

Fabrication

Fabrication of digital system 10 or digital system 1000 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Thus, a digital system is provided with a processor having an improved instruction fetch and dispatch mechanism. Advantageously, by allowing execute packets to span fetch packets, memory is not wasted with useless NOP instructions.

Advantageously, in some system a smaller memory may result from elimination of NOP instructions.

Advantageously, fewer fetch cycles are required for execution of a given processing algorithm since useless NOP instructions are not fetched.

In another embodiment, fetch packets may be longer or shorter than the present embodiments. For example, a fetch packet may be four instruction words. Likewise, instruction words may be other sizes than 32-bits.

In another embodiment, there may be more or fewer execution units than eight. Likewise, the number of execution units may differ from the size of the fetch packet. For example, a processor may have an eight word fetch packet and have ten execution units, for example. In such an embodiment, an execution packet may exceed the length of a fetch packet and may therefore span more than two fetch packets.

In another embodiment, a different form of dispatching circuitry may be provided to select an execution packet from two or more fetch packets.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital processing system having a microprocessor, wherein the microprocessor comprises:
fetch circuitry for fetching instruction fetch packets from sequential memory address locations, wherein each fetch packet contains a first plurality of fixed and equal length instructions, each instruction including an instruction type and a predetermined p-bit, said p-bit having a first digital state indicating a next instruction is to execute in parallel with said instruction and a second digital state indicating a next instruction is to execute in a cycle after said instruction;
a second plurality of functional units, each of the second plurality of functional units operable to execute a corresponding instruction in parallel with other functional units, and
dispatch circuitry connected to said fetch circuitry and said second plurality of functional units operable to
select an execute packet from two fetch packets, wherein an execute packet varies in size and contains only a set of instructions that can be executed in parallel on the plurality of functional units, by scanning instructions from lower memory address locations to higher memory address locations beginning in a first fetch packet, adding an instruction to said execute packet when said p-bit of a prior instruction has said first digital state and continuing past an end of said first fetch packet to a beginning of a second fetch packet until said p-bit of an instruction has said second digital state, and
dispatch each instruction of said selected execute packet to a functional unit corresponding to said instruction type of said instruction,
wherein the dispatch circuitry comprises:
a first latch to hold said first plurality of instructions of a first fetch packet, said first latch including a first plurality of sections, each section storing a corresponding one of said first plurality of instructions of said first fetch packet;
a second latch to hold said first plurality of instructions of a second fetch packet immediately following said first fetch packet, said second latch including a first plurality of sections, each section storing a corresponding one of said first plurality of instructions of said second fetch packet;
a first plurality of multiplexers, each multiplexer having exactly two data inputs, a first data input receiving an entire instruction from a predetermined section of said first latch and a second data input receiving an entire instruction from a corresponding section of said second latch, a control input and an output, each multiplexer selecting at said output either said entire instruction from said section of said first latch, said entire instruction from said section of said second latch, or no instruction, dependent upon said control input;
a dispatch control circuit connected to said first latch, said second latch, and said plurality of multiplexers, said dispatch control circuit receiving said predetermined p-bit from each instruction of said first latch and each instruction of said second latch for control of said plurality of multiplexers via said control inputs according to the execute packets determined by only said p-bits; and
a cross point circuitry connected to said outputs of said plurality of multiplexers for dispatching said instructions at said output of said multiplexers to a functional unit corresponding to said instruction type of each instruction.

2. A method of operating a digital system having a microprocessor, wherein the microprocessor has a plurality of functional units for executing instructions in parallel, comprising the steps of:
storing fixed and equal length instructions at sequential memory address locations, each instruction including an instruction type and a predetermined p-bit, said p-bit having a first digital state indicating a next instruction is to execute in parallel with said instruction and a second digital state indicating a next instruction is to execute in a cycle after said instruction;
fetching a sequence of instruction fetch packets, wherein each fetch packet contains a first plurality of instructions;
scanning the p-bit of each instruction of each fetch packet from lowest memory address location in a first memory fetch packet to highest memory address location in a second immediately following fetch packet to determine an execute packet dependent on the p-bits, wherein said step of determining an execute packet boundary dependent upon the p-bits includes
storing each instruction of said first fetch packet in a corresponding section of a first latch,
storing each instruction of said second fetch packet in a corresponding section a second latch, and
selecting only one output from among the set consisting of an entire instruction from a predetermined section of said first latch, an entire instruction from a corresponding section of said second latch, and no instruction, dependent upon only said p-bit from each instruction stored in said first latch and each instruction stored in said second latch; and
dispatching each selected instruction within the determined execute packet to one of a second plurality of execution units dependent upon an instruction type of the instruction.

* * * * *